United States Patent [19]

Buchwald et al.

[11] 4,107,586
[45] Aug. 15, 1978

[54] CONTROL SYSTEM FOR A COMPOUND DC ELECTRIC MOTOR

[75] Inventors: Frank S. Buchwald, Beachwood; Grant C. Melocik, Chardon, both of Ohio

[73] Assignee: Towmotor Corporation, Mentor, Ohio

[21] Appl. No.: 761,929

[22] Filed: Jan. 24, 1977

[51] Int. Cl.² .............................................. H02P 1/16
[52] U.S. Cl. .................................. 318/426; 318/430; 318/391; 318/431
[58] Field of Search ............... 318/101, 247, 388, 424, 318/425, 426, 391, 430, 431, 484, 405, 452

[56] References Cited

U.S. PATENT DOCUMENTS

| Re. 19,547 | 4/1935 | Wright | 318/247 |
| 2,149,472 | 3/1939 | Sloane | 318/388 |
| 3,958,164 | 5/1976 | Hess | 318/431 |

Primary Examiner—Robert K. Schaefer
Assistant Examiner—Michael K. Mutter
Attorney, Agent, or Firm—John W. Grant

[57] ABSTRACT

A control system for a compound DC electric motor includes a shunt field winding connected in parallel with a series field winding, with both windings being connected to a power source. A time delay is positioned between the series field winding and the power source for energizing the series field winding a predetermined time period after the energization of the shunt field winding.

5 Claims, 4 Drawing Figures

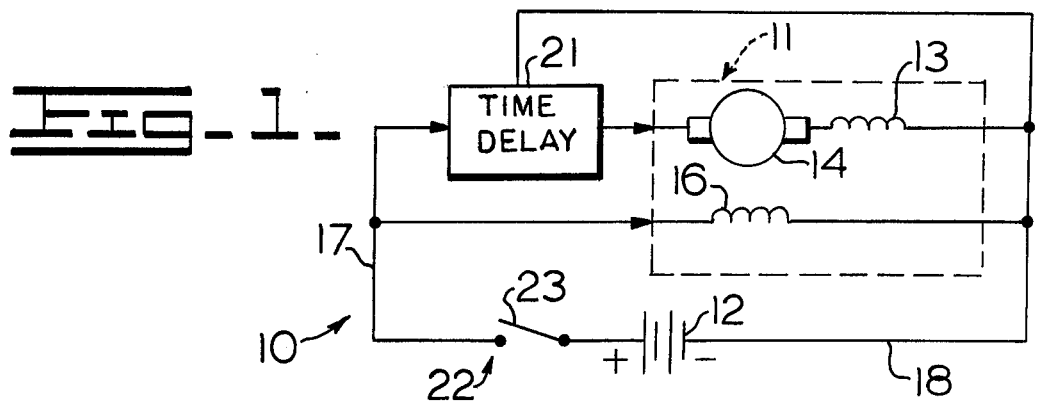
Fig-1-
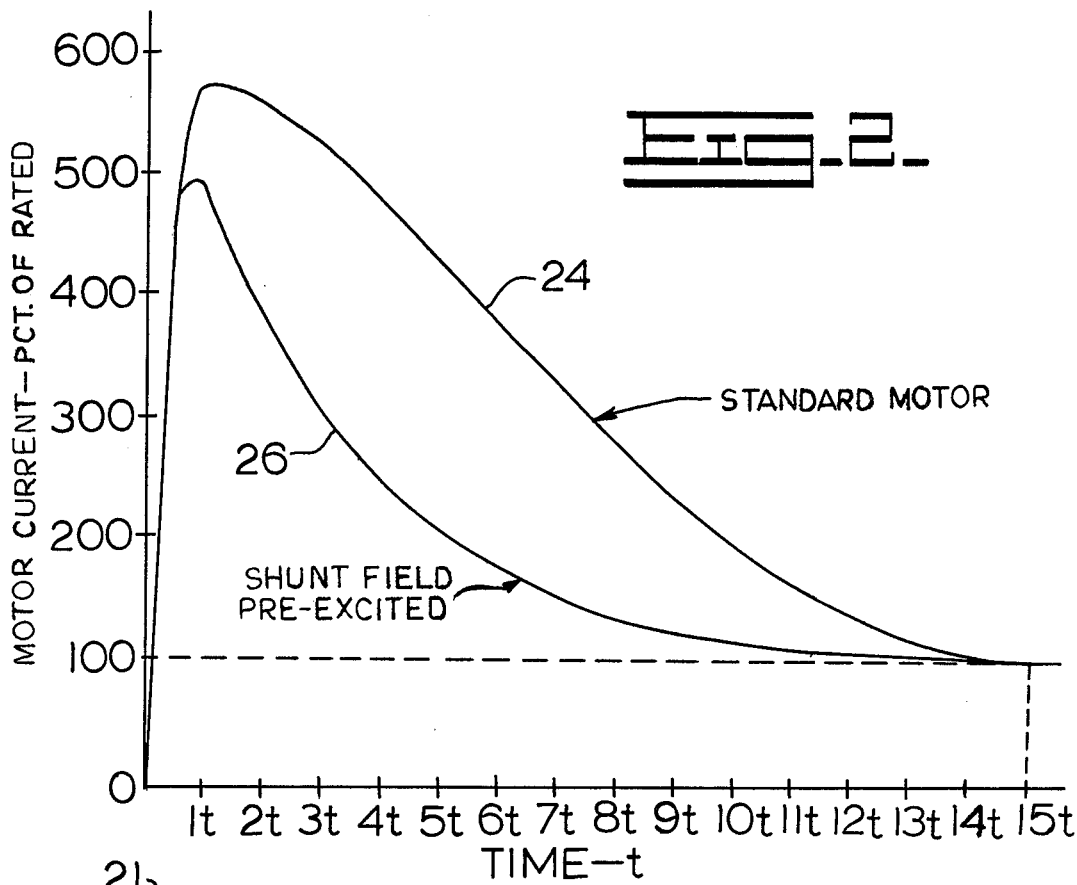
Fig-2-
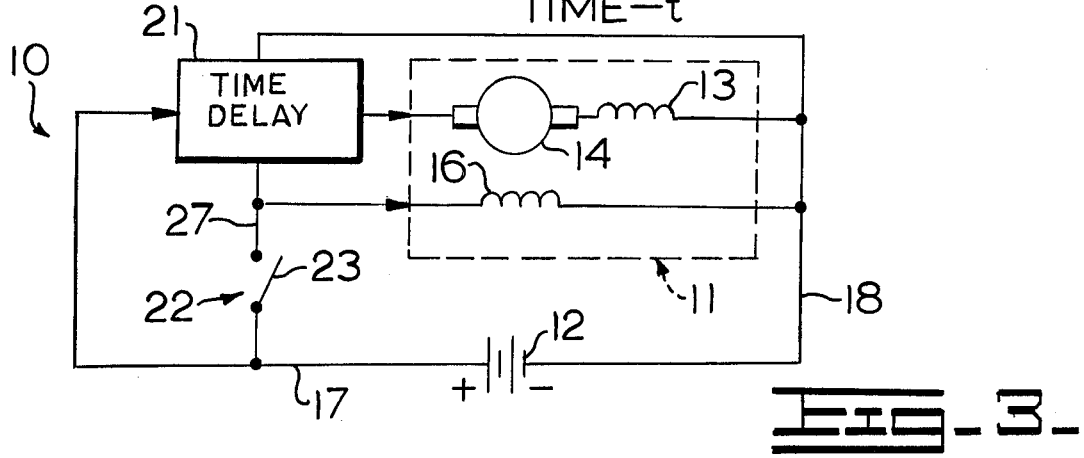
Fig-3-

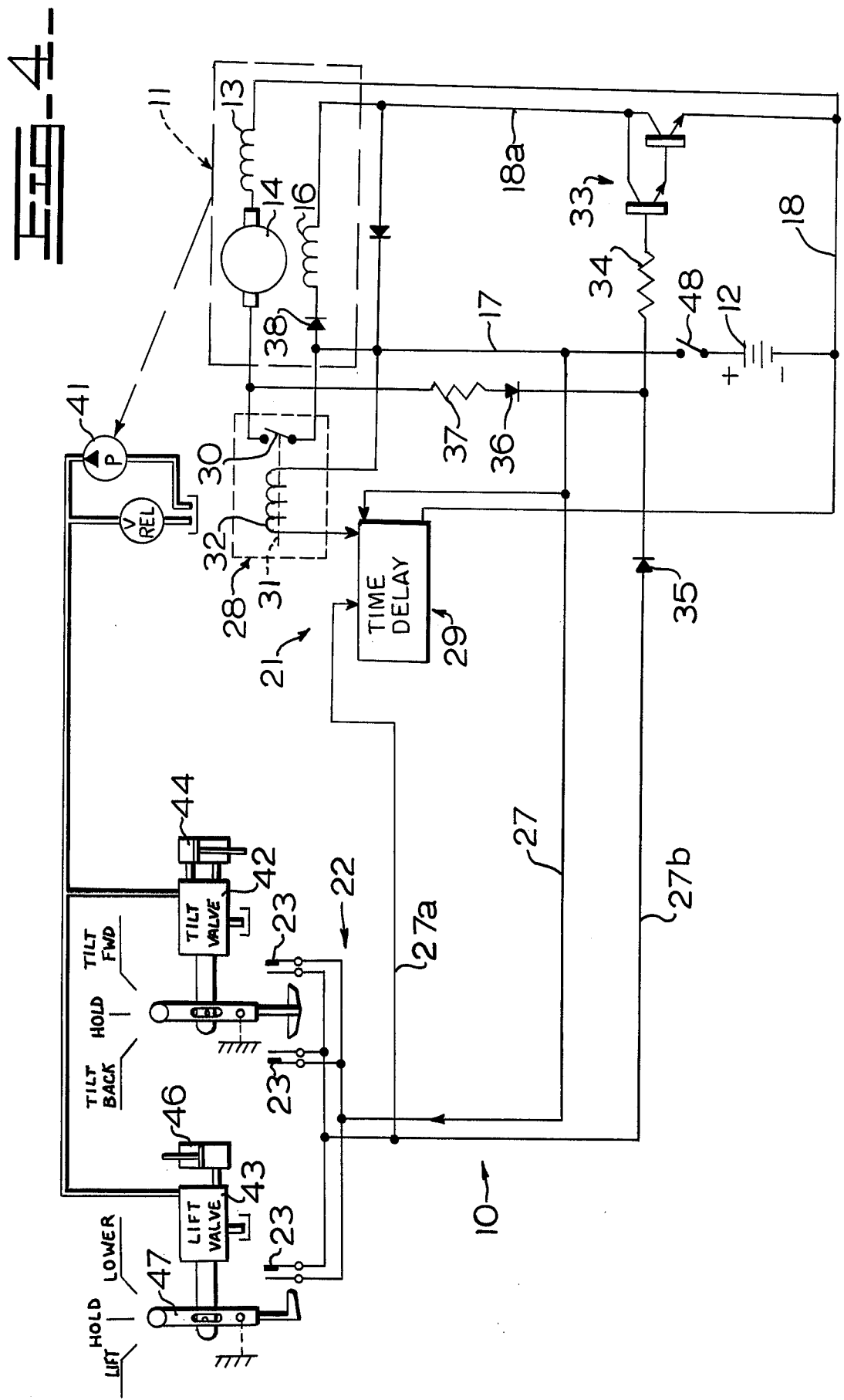

CONTROL SYSTEM FOR A COMPOUND DC ELECTRIC MOTOR

BACKGROUND OF THE INVENTION

Compound DC electric motors have at least two field windings with one being in series with the armature winding and the other being in parallel therewith. In many of such compound motors the series field winding has a relatively small number of low resistance turns in comparison with the shunt field winding. Thus, the shunt field winding has a comparatively long time-constant. Consequently, when electrical power is first applied to such motor, a heavy current flows through the armature and series field winding circuit prior to the time that normal current flow can be established in the shunt field winding. As the two field windings are closely coupled inductively, the relatively high current in the series field winding circuit tends to momentarily induce a reversed current flow in the shunt field winding. This contributes to extremely large current surges flowing through the windings and other conductors including the brushes. These current surges during start-up cause severe heating, brush deterioration, power wastage, may interfere with proper commutation, and in general tend to reduce the operational life of the motor. If the motor is being operated from a battery, the abnormal current may also cause premature battery deterioration.

The present invention is directed to overcoming one or more of the problems as set forth above.

According to the present invention, a control system for a compound DC electric motor having a power source comprises a series field winding, a shunt field winding connected in parallel with the series field winding, and means for connecting the shunt field winding and series field winding with the power source. Time delay means is positioned between the series field winding and the power source for energizing the series field winding a predetermined time period after the energizing of said shunt field winding.

BRIEF DESCRIPTION OF THE DRAWINGS

FIG. 1 is a schematic view of a control system for a compound DC electric motor.

FIG. 2 is a graphical diagram depicting total motor current as a function of time in a representative control system embodying the invention and also in a typical prior art control system.

FIGS. 3 and 4 are schematic views of alternate embodiments of the control system.

DETAILED DESCRIPTION OF THE INVENTION

Referring initially to FIG. 1 of the drawings, a simplified control system 10 is shown in schematic form together with a compound DC electric motor 11 having a power source such as a battery 12 connected thereto. The motor itself is of known construction and includes a series field winding 13 connected in series with the winding of a rotatable armature 14, and a shunt field winding 16 connected in parallel with the series field winding. As is understood by those skilled in the art, the series field winding may have relatively few turns in comparison with the shunt field winding depending on the operational characteristics which are desired for the motor. Also, while the series field winding and shunt field winding are shown separated in the drawing for clarity of illustration, in practice such windings may be physically intermixed although the two windings are insulated from each other by insulative varnish or the like.

Means for connecting both the shunt field winding and the series field winding to the opposite terminals of the power source 12 includes first and second conductors 17 and 18 leading from the positive and negative terminals, respectively, of the power source. Completing the circuit from the power source to both the shunt field winding and the series field winding results in current flow therethrough and rotation of the armature.

Time delay means 21 is positioned in the first conductor 17 between the series field winding-armature circuit 13, 14 and the power source 12 for energizing the series field winding a predetermined time period after the energization of the shunt field winding 16.

The time delay means 21 of this embodiment is of known construction and in order to facilitate an understanding of the present invention, it is sufficient to note that it is of the type which is initially activated by current flow through the first conductor 17 thereto and subsequently automatically completes the circuit to energize the series field winding only after it has been activated for the preselected time period.

Control means 22 in the form of a switch 23 is serially positioned in the first conductor between the power source 12 and both the time delay means 21 and the shunt field winding 16. Thus, the switch provides control for activating the time delay means simultaneously with the start of energizing the shunt field winding.

In the operation of the control system 10 of this embodiment, switch 23 is closed to simultaneously complete the circuit to the shunt field winding 16 and the time delay means 21. This starts to energize the shunt field winding at the same time the time delay is activated. After the time delay means has been activated for a preselected time, it completes the circuit therethrough to energize the series field winding 13. Preferably, the predetermined time period is selected so that the shunt field winding is fully excited before the circuit to the series field winding is completed.

The advantages gained by providing the time delay means 21 in the control system 10 so that the shunt field winding 16 is pre-energized before the series field winding is energized may be seen by reference to FIG. 2 taken from light beam oscillograph traces in the course of actual test of a motor. In FIG. 2, curve 24 is the measured current flow through a compound DC motor without the time delay means in percent of rated current as a function of time ($t$) wherein the circuit was completed to both the series field winding and shunt field winding simultaneously. Curve 26 shows the corresponding start-up current flow in the same motor when the control system is provided with the time delay means in the series field winding in accordance with the present invention. Thus, the control system of the present invention decreases starting current in a motor very significantly in relation to the conventional control system for the motor.

Referring to FIG. 3 of the drawings, a second embodiment of the control system 10 is shown in schematic form and has the time delay means 21 serially positioned in the first conductor 17 between the series field winding and the positive terminal of the power source 12. A third conductor 27 is connected to the positive terminal of the power source 12 by way of the first conductor 17 and to both the shunt field winding 16 and the time delay means. The time delay means of this embodiment is of slightly different known configuration which is activated by an electrical signal through the third conductor. After the predetermined time period has passed, the circuit therethrough is completed so that current flows from the power source to the series field winding.

The operation of the second embodiment is substantially the same as that described with reference to FIG. 1 in that when the switch 23 is closed, the circuit to the shunt field winding is immediately completed while the completion of the circuit to the series field winding is delayed by the time delay means. This permits the shunt field winding to be pre-excited before the series field winding is energized.

Referring to FIG. 4, a third embodiment of the control system 10 is shown in schematic form and is essentially a more detailed disclosure of the control system of FIG. 3 with slight modifications thereto. In this embodiment, the time delay means 21 includes an electrical switching device such as an electromechanical relay 28 and a time delay device 29 associated therewith. The electrical switching device has a contactor 30 serially positioned in the first conductor 17 between the power source 12 and the series field winding 13. An actuator 31 is connected to the contactor and is operative to close the contactor when a coil 32 is energized. The actuating coil is serially positioned between the positive terminal of the power source and the time delay device.

An electronic switching device such as a Darlington amplifier 33 is serially positioned in a second conductor 18a between the shunt field winding 16 and the negative terminal of the power source 12. The electronic switching device is switchable to a conductive condition to complete the circuit to the shunt field winding by an electrical signal directed thereto through a resistor 34 and a diode 35 positioned in series therewith. Three switches 23 are provided in parallel to each other with each switch being serially positioned in the third conductor 27 between the power source and both the time delay device 29 and the electronic switching device 33.

The time delay device 29 in this embodiment is activated when one of the switches 23 is closed to complete a circuit thereto through the third conductor 27a. After the preselected time period a circuit is completed therethrough. This completes the electrical circuit to the actuating coil 32 thereby energizing it so that the contactor 30 is closed. This particular time delay also has an off delay wherein the circuit therethrough momentarily remains completed after the one switch 23 is opened. Thus, the actuating coil remains energized which in turn causes the series field winding to remain energized. To prevent loss of control over the armature speed, the first conductor 17 between the contactor 30 and the series field winding 13 is connected to the third conductor 27b between the diode 35 and the resistor 34 through a diode 36 and resistor 37. This maintains the electronic switching device 33 in its conductive condition until the contactor opens at the end of the off delay established by the time delay device.

In some cases, the time delay device 29 may also be employed for other purposes wherein the preselected time period may not be adjusted properly for the shunt field winding 16 to be fully excited prior to the circuit to the series field winding 13 being completed. A diode 38 is positioned in series with the shunt field winding to prevent establishment of negative ampere turns in the shunt field winding during motor start-up when the preselected time period is of less duration than the time required for the shunt field winding to become fully excited.

In the operation of the control system of the third embodiment, start-up of the motor 11 is initiated by an operator closing one of the switches 23 to complete the circuit to both the time delay device 29 and the electronic switching device 33. This simultaneously activates the time delay device and renders the electronic switching device conductive so that the shunt field winding 16 is energized. At the end of the predetermined time period of the time delay device, a circuit is completed therethrough causing the actuating coil 32 to be energized which in turn causes the contactor 30 to be closed and the circuit to the series field winding 13 completed. With both the series field winding and the shunt field winding fully excited, the armature 14 starts to rotate.

As shown in FIG. 4, the compound motor 11 may be employed for driving a fluid pump 41 of a fluid circuit such as for a lift truck. The fluid circuit includes a tilt valve 42 and a lift valve 43 for individually controlling the actuation of a pair of fluid jacks 44 and 46, respectively. Each of the valves has a lever 47 connected thereto so that each valve may be manually shifted to an actuating position. Manipulation of either lever to shift the respective valve also closes a respective one of the switches 23 to start the motor as previously described. A key operated disconnect switch 48 is positioned in the first conductor 17 adjacent the power source 12 in the usual manner.

In some compound DC electric motors, it is feasible to pre-excite the shunt field winding well in advance of energizing the series field winding or to maintain the shunt field winding in an excited condition continuously while starting and stopping of the motor is achieved by connecting and disconnecting the power source to the series field winding. Thus, another alternative would be to replace the time delay 21 of FIG. 3 with a manually actuated switch thereby providing a means to energize the shunt field winding independently of the means of energizing the series field winding. With such manually actuated switch in an open position, the switch 23 is closed at a first preselected time so that the shunt field winding 16 is energized. The replacement manually actuated switch is then closed at a second preselected later time so that the shunt field winding is at least partially pre-excited before the series field winding 13 is energized.

Other aspects, objects and advantages will become apparent from a study of the drawings, the disclosure, and the appended claims.

The embodiments of the invention in which an exclusive property or privilege is claimed are defined as follows:

1. A control system for connecting a power source to a compound DC electric motor which has a series field winding connected in parallel with a shunt field winding, comprising:

time delay means for energizing said series field winding only after said shunt field winding has been energized for a predetermined period of time, said time delay means including an electrical switching device and a time delay device, said electrical switching device being positioned between the series field winding and the power source, said time delay device being connected to the electrical switching device and being of a type activated by an electrical signal thereto for completing an electrical circuit to actuate the electrical switching device after being activated for said predetermined period of time;

an electronic switching device positioned between the power source and the shunt field winding, said electronic switching device being of the type rendered conductive by an electrical signal thereto; and a switch positioned between the power source and both the time delay device and the electronic switching device for delivering said electrical signal simultaneously to the time delay device and the electronic switching device.

2. The control system of claim 1 wherein the time delay device includes an off delay in which the circuit therethrough to the electronic switching device remains completed a preselected time period after the time delay device is de-activated, and including means associated with the series field winding to maintain the shunt field winding energized during the off delay preselected time period.

3. The control system of claim 1 including a diode positioned in series between the power source and the shunt field winding.

4. In a control system for a compound DC electric motor which has a series field winding connected in parallel with a shunt field winding, said control system having a power source, the improvement comprising:

an electronic switching device connected in series between the power source and the shunt field winding, said electronic switching device being of the type rendered conductive by an electrical signal thereto;

time delay means positioned between the series field winding and the power source for energizing the series field winding only after said time delay means has been activated for a predetermined period of time, said time delay means being of the type activated by an electrical signal thereto; and a switch positioned between the power source and both the electronic switching device and the time delay means for delivering said electrical signals simultaneously to both the time delay means and the electronic switching device.

5. The control system of claim 4 including a diode positioned in series between the power source and the shunt field winding.

* * * * *